Jan. 28, 1947.   J. R. RAFTER   2,415,030
ADHESION OF RUBBER TO MAGNESIUM
Filed Dec. 18, 1944
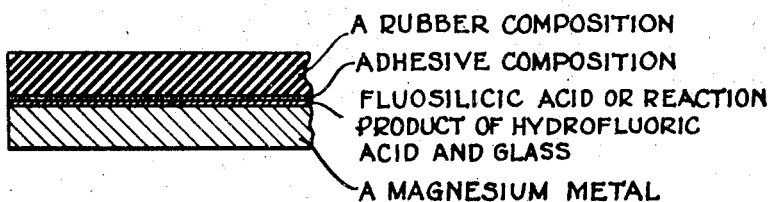
INVENTOR
JOHN R. RAFTER
BY
ATTORNEYS Patented Jan. 28, 1947

2,415,030

UNITED STATES PATENT OFFICE 2,415,030

ADHESION OF RUBBER TO MAGNESIUM

John Richard Rafter, Sharon, Mass., assignor to The Firestone Tire & Rubber Company, Akron, Ohio, a corporation of Ohio Application December 18, 1944, Serial No. 568,792

3 Claims. (Cl. 154—130)

This invention relates to a method of bonding a rubber to magnesium or its alloys.

Heretofore it has been exceedingly difficult to bond a rubber to a magnesium metal with a high degree of adhesion. Temporary bonds have been obtained by using thermoplastic adhesive compositions, but these bonds were unsatisfactory at high operating temperatures.

It is an object of the invention to provide a method of producing satisfactory adhesion between a magnesium metal and a rubber. Other objects will be manifest in the following detailed description of the invention, reference being made to the single figure of the accompanying drawing for an illustration of a generic aspect of the invention.

It has now been found that the surface of a magnesium metal may be given a special pretreatment to make it capable of adhering to a rubber. The magnesium article is treated with an aqueous solution of fluosilicic acid or an aqueous solution of hydrofluoric acid in the presence of glass. The treated surface may then be strongly bonded to a rubber by means of a rubber-to-metal adhesive composition or tie-gum of a conventional type.

The metal article includes a surface of a magnesium metal, that is, magnesium or a magnesium alloy, such as is commercially available at present. A rubber suitable for use in the invention includes natural rubber and the various vulcanizable synthetic rubbers, such as Buna N (copolymer of butadiene and acrylonitrile), Buna S (copolymer of butadiene and styrene), neoprene (polymers and copolymers of 2-chloro-1,3-butadiene), butyl rubber (copolymers of isoprene and isobutene), and similar vulcanizable rubbers based upon the polymerization of butadiene, its homologs or substitution products, alone or in combination with one or more polymerizable unsaturated compounds.

In general, any adhesive cement composition or tie-gum, which is capable of producing a strong bond between a rubber and steel may be employed to bond a rubber to the surface of a magnesium metal treated in accordance with this invention. Examples of commercial adhesive cements operative in the present process include chlorinated rubber adhesive cements (e. g., "Ty-Ply R or Q" and "Ty-Ply S" cements marketed by the R. T. Vanderbilt Co.), rubber hydrochloride cements (e. g., "Bondoprene R" and "Bondoprene S" marketed by the Marbon Corp.), and various cements based upon a modified rubber, such as "cyclized rubber" or rubber isomers having less unsaturation than unvulcanized rubber (e. g., "Reanite" cements sold by U. S. Stoneware Co.).

The invention is illustrated by the following examples.

Example 1

Strips of a commercial magnesium alloy ("Dowmetal," containing about 85–98% of magnesium, marketed by Dow Chemical Co.) were immersed in a 20% aqueous solution of hydrofluoric acid contained in a "Pyrex" glass beaker. At first the visible reaction between the magnesium metal strips and the acid was very slight, but the rate of reaction gradually increased with increasing time of immersion. After 3 hours' immersion the strips were removed from the acid, washed with water and baked for 2 hours at 140° C. The baked strips were then coated with "Bondoprene R" cement, dried, and then cured for 40 minutes at 280° F. in pressure contact with a vulcanizable rubber composition in a mold. The vulcanized rubber was found to be firmly bonded to the magnesium strip both at room temperature and at elevated temperatures. Magnesium strips which had been immersed only 5 seconds in the acid and then treated the same as the other strips just discussed, adhered only slightly to rubber vulcanized in contact therewith.

Example 2

Other strips of a magnesium alloy were immersed for 3 hours in a 20% aqueous solution of hydrofluoric acid in a glass beaker. The strips were removed from the beaker and immediately baked for 2 hours at 140° C. The baked strips were washed with water and dried at 140° C. Thereafter, the strips were bonded to rubber by means of "Bondoprene R" cement, as in Example 1, and a very high degree of adhesion was thereby produced between the rubber and metal.

Example 3

Strips of "Dowmetal" were treated with hydrofluoric acid as in Example 2. The treated strips were coated with "Bondoprene S" cement, dried, and then coated with "Bondoprene R" cement and dried. The coated strips were vulcanized with rubber as before and were found to adhere very satisfactorily to the vulcanized rubber.

Example 4

Strips of a magnesium alloy were treated with hydrofluoric acid in glass as in Example 2 and then bonded to rubber by means of a "Reanite" rubber-to-metal adhesive cement. Good adhesion between the rubber and magnesium was obtained.

Example 5

Strips of Dowmetal were treated with hydrofluoric acid as in Example 2 and then bonded to rubber by means of "Ty-Ply R" cement. Good adhesion was developed between the rubber and metal.

Other experiments have indicated that the substance which reacts with the magnesium in the hydrofluoric acid bath is a fluosilicic acid and/or other reaction product of a silica-containing glass and hydrofluoric acid.

Variations in details and proportions may be made in the process of the invention as set out in the foregoing examples without departing from the spirit or scope of the invention, as defined in the appended claims.

What is claimed is:

1. A method of bonding a rubber to a magnesium metal, which includes treating a surface of the metal with a substance selected from the group consisting of fluosilicic acid, hydrofluoric acid in the presence of a glass, and a reaction product of hydrofluoric acid and a glass, baking the treated surface, applying an adhesive cement to the baked surface, and heating a vulcanizable rubber composition in contact with the cement-coated surface.

2. A method of bonding a rubber to a magnesium metal, which includes treating a surface of the metal with a substance selected from the group consisting of fluosilicic acid, hydrofluoric acid in the presence of a glass, and a reaction product of hydrofluoric acid and a glass, applying an adhesive cement to the treated surface, and vulcanizing a rubber in contact with the cement-coated surface.

3. A method of bonding a rubber to a magnesium metal, which includes treating a surface of the metal with a substance selected from the group consisting of fluosilicic acid, hydrofluoric acid in the presence of a glass, and a reaction product of hydrofluoric acid and a glass, applying an adhesive composition to the treated surface, and pressing a rubber composition against the metal.

JOHN RICHARD RAFTER.